(12) United States Patent
Hsu et al.

(10) Patent No.: US 7,286,082 B2
(45) Date of Patent: Oct. 23, 2007

(54) METHOD AND APPARATUS FOR WIDE AREA AUGMENTATION SYSTEM HAVING GEO UPLINK SUBSYSTEM WITH ENHANCED CLOCK STEERING

(75) Inventors: Po-Hsin Hsu, Irvine, CA (US); Mohinder S. Grewal, Anaheim Hills, CA (US)

(73) Assignee: Raytheon Company, Waltham, MA (US)

( * ) Notice: Subject to any disclaimer, the term of this patent is extended or adjusted under 35 U.S.C. 154(b) by 291 days.

(21) Appl. No.: 11/063,782

(22) Filed: Feb. 23, 2005

(65) Prior Publication Data

US 2005/0190102 A1 Sep. 1, 2005

Related U.S. Application Data

(60) Provisional application No. 60/547,847, filed on Feb. 26, 2004.

(51) Int. Cl.
*G01S 5/14* (2006.01)
(52) U.S. Cl. .................................. 342/357.02
(58) Field of Classification Search ............ None
See application file for complete search history.

(56) References Cited

FOREIGN PATENT DOCUMENTS

WO WO 99/18677 4/1999

OTHER PUBLICATIONS

Grewal, et al "GEO Uplink Subsystem (GUS) Clock Steering Algorithms Performance, Validation, and Test Results", 1999, pp. 173-180.*
PCT/US2006/021223 International Search Report dated Dec. 14, 2006.
Po-Hsin Hsu, Laura Cheung, Mohinder Grewal, Prototype Test Results of L1/L5 Signals of Future GEO Satellites, Sep. 21, 2004, pp. 1359-1366, Department of Electrical Engineering, California State University, Fullerton, California.
Po-Hsin Hsu, Laura Cheung, Mohinder Grewal, Prototype Test Results of L1/L5 Signals of Future GEO Satellites, Sep. 2003, pp. 1-7.
Po-Hsin Hsu and Thomas W. Plummer, A New Algorithm For WAAS GEO Uplink Subsystem (GUS) Clock Steering, Sep. 9-12, 2003, pp. 1-9, California State University, Fullerton, California.
Shau-Shiun Jan, Analysis of a Three-Frequency GPS/WAAS Receiver to Land an Airplane, pp. 1-11, Department of Aeronautics and Astronautics Stanford University, California 94305.
Po-Hsin Hsu, Alternate Clock Steering Prototype Testing Activities in Jan. and Feb. 2001, Feb. 20, 2001, pp. 1-35, Raytheon Company, Waltham, Massachusetts.

(Continued)

*Primary Examiner*—Gregory C. Issing
(74) *Attorney, Agent, or Firm*—Daly, Crowley, Mofford & Durkee, LLP (57) ABSTRACT

A system to provide navigation signals to a space vehicle includes an uplink system for a geostationary earth satellite having clock steering derived from smoothed receiver clock error, long term clock error average, and long term clock offset average information. A proportional-integral-differential controller can be used to generate clock adjustment commands to a frequency standard clock.

16 Claims, 3 Drawing Sheets

OTHER PUBLICATIONS

Alan G. Evans, Robert W. Hill, Geoffrey Blewitt, Evertt R. Swift, Thomas P. Yunck, Ron Hatch, Stephen M. Lichten, Stephen Malys, John Bossler, James P. Cunningham. The Global Positioning System Geodesy Odyssey, Spring, 2002, pp. 1-28, Journal of the Inst. of Navigation, vol. 49(1), 7-34.

Dr. A. J. Van Dierendonck, AJ Systems, Planned GPS Civil Signals and Their Benefits to the Civil Community.

RTCA, Inc., Minimum Operational Performance Standards For Global Positioning System/Wide Area Augmentation System Airbourne Equipment, Nov. 28, 2001.

M.S. Grewal, W. Brown, R. Lucy, P. Hsu, Geo Uplink Subsystem (GUS) Clock Steering Algorithms Performance, Validation, and Test Results, 1999, pp. 173-180.

William J. Klepczynski, The Role of Time and Frequency In The Wide Area Augmentation System (WAAS), 1998, pp. 235-240.

PCT/US2005/006094 PCT International Search Report dated Aug. 16, 2005.

Wide Area Augmentation Systems, Geostationary Communication and Control Segment (GCCS) Specification, Mar. 15, 2002, pp. 1-75.

Deihim Hashemi, Daniel O'Laughlin, Extending Wide Area Augmentation System Service into Central and South America, Apr. 29, 2004, 33 pages.

Todd Walter, WAAS MOPS: Practical Examples, pp. 1-11, Stanford University, California. Apr. 1, 2004.

Shau-Shiun Jan, Analysis of a Three-Frequency GPS/WAAS Receiver to Land an Airplane, pp. 1-11, Department of Aeronautics and Astronautics Stanford University, California 94305, Jan. 2002.

Dr. A. J. Van Dierendonck, AJ Systems, Planned GPS Civil Signals and Their Benefits to the Civil Community, Apr. 2003.

* cited by examiner

METHOD AND APPARATUS FOR WIDE AREA AUGMENTATION SYSTEM HAVING GEO UPLINK SUBSYSTEM WITH ENHANCED CLOCK STEERING

CROSS REFERENCE TO RELATED APPLICATIONS

The present application claims the benefit of U.S. Provisional Patent Application No. 60/547,847, filed on Feb. 26, 2004, which is incorporated herein by reference.

STATEMENT REGARDING FEDERALLY SPONSORED RESEARCH

The Government may have rights in the invention pursuant to Contract Number DR145940, which is a subcontract FAA contract DTFA01-03-C-00059.

BACKGROUND

The Wide Area Augmentation System (WAAS) is a safety critical system that augments the Department of Defense Global Positioning System (GPS) Standard Positioning Service (SPS). The WAAS system is described by the WAAS Minimum Operational Performance Standards (MOPS), identified as document RTCA/DO-229C, Minimum Operational Performance Standards for Global Positioning System/Wide Area Augmentation System Airborne Equipment, 28 Nov. 2001, which is incorporated herein by reference and well known by one of ordinary skill in the art.

The WAAS provides a means for air navigation in the National Airspace System (NAS) from departure through en route and approach. The WAAS augments GPS with the following: a ranging function, which improves availability and reliability; differential GPS corrections, which improve accuracy; and integrity monitoring, which improves safety. The system provides a Signal-in-Space (SIS) to WAAS-certified aircraft avionics for any FAA approved phase of flight. The SIS provides various services including WAAS message broadcast, and ranging capability.

WAAS is divided into three types of sites; the Wide Area Reference Station (WRS), the Wide Area Master Station (WMS) and the GEO Uplink Subsystem (GUS). GUS refers to the GEO Uplink Subsystem implemented in the WAAS program and GUST refers to the GEO uplink Subsystem implemented in the Geostationary Communication and Control Segment (GCCS) program. Wide-Area Reference Stations (WRSs) are distributed throughout the U.S. National Airspace System. These reference stations collect GPS and GEO measurements and send them to the WMSs. The WMSs process the data to provide correctional and integrity information for each GEO and GPS satellite. The correction information includes as separate components the satellite ephemeris errors, clock bias, and ionosphere estimation data. The corrections from the WMS are sent to the GUST for uplink to the GEO.

The Geostationary Communication and Control Segment (GCCS) comprises two GUST subsystems and a GEO satellite. The two GUST subsystems are operationally independent of each other and geographically separated in order to mitigate simultaneous loss due to natural disasters, for example. One GUST subsystem operates as the primary uplink to the satellite while the other GUST subsystem operates as a backup, radiating into a dummy load. Each GUST subsystem includes two subsystems, the Signal Generator Subsystem (SGS) and the Radio Frequency Uplink (RFU) Subsystem. The SGS receives WAAS messages from the WMS and combines the WAAS message with the correct GPS L1 and L5 modulations and Pseudorandom Noise (PRN) Gold Codes to create the WAAS L1 and L5 uplink signals. The RFU receives these IF PRN coded L1 and L5 uplink signals from the SGS, converts them to the RF uplink frequencies, amplifies, and transmits the signals to the GEO Satellite.

The RFU receives the downlink L1 and L5 WAAS signals from the GEO Satellite, amplifies the signals and provides the resulting L1 and L5 signals to the SGS. The SGS extracts the GEO measurements and uses them as inputs to a control loop that adjusts the uplink signal to compensate for the uplink iono delay and Doppler effects such that the code and carrier phase of the downlink L1 and L5 signals are coherent. The GUST subsystem also contains a Cesium frequency standard used as the frequency reference for the signal generator and the receiver.

BRIEF DESCRIPTION OF THE DRAWINGS

The exemplary embodiments contained herein will be more fully understood from the following detailed description taken in conjunction with the accompanying drawings, in which.

DETAILED DESCRIPTION

Figure 1:
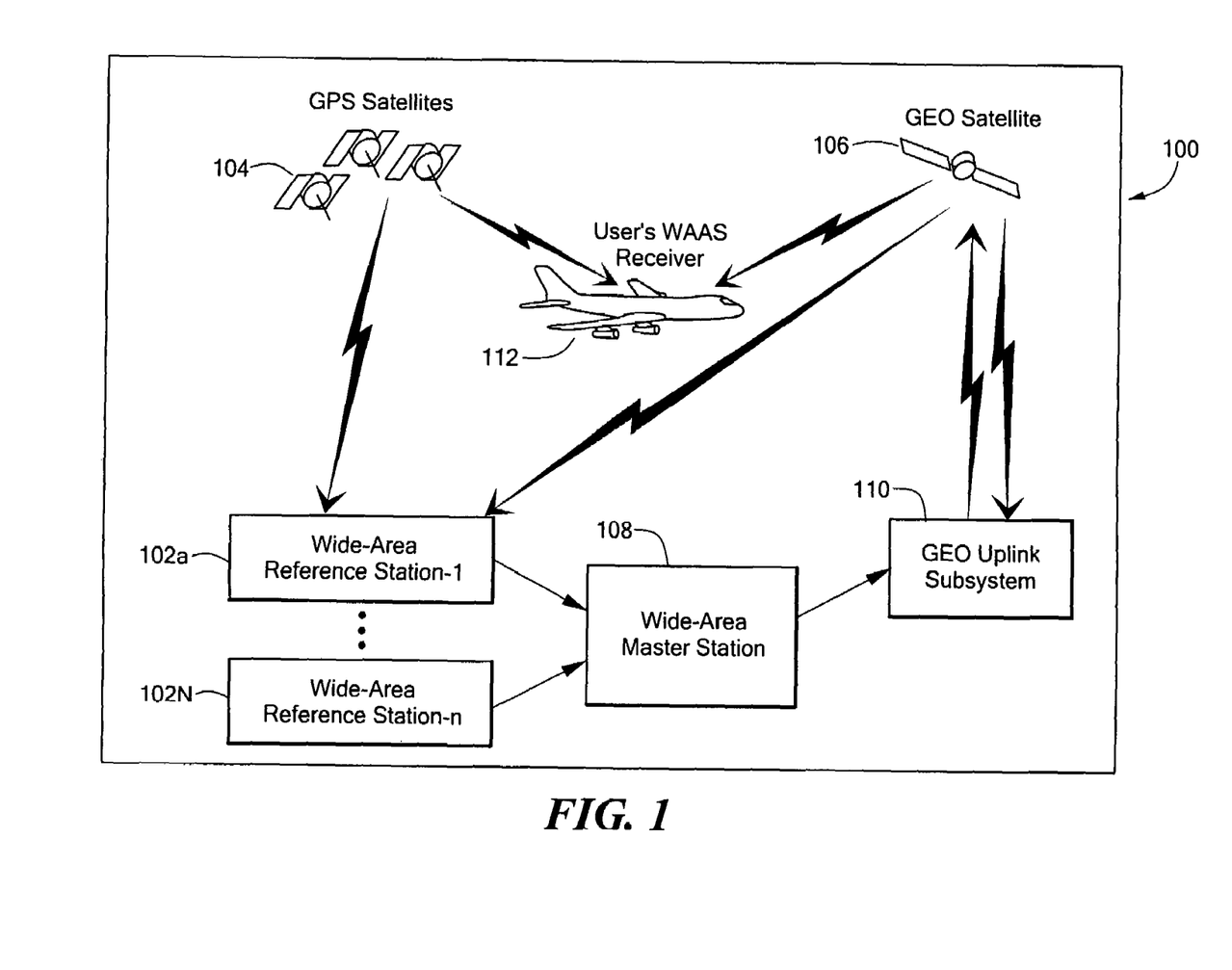
FIG. 1 is a pictorial representation of a WAAS system having clock steering in accordance with the present invention.

FIG. 1 shows a WAAS system 100 in which wide-area reference stations (WRSs) 102a-N receive signal from GPS satellites 104 and a GEO satellite 106. A wide-area master station (WMS) 108 communicates with the wide-area reference stations 102 and provides information to a GEO uplink subsystem (GUS) 110, which receives signals including L1 and L5 signals from the GEO satellite 106 and provide correction information to the GEO satellite 106. A space vehicle (SV) 112, such as an aircraft, uses information from the GPS satellites 104 and the GEO satellite 106 to navigate in space In conventional WAAS systems, the WAAS Wide Area Master Station (WMS) calculates WAAS Network Time (WNT) and estimates clock parameters (offset and drift) for each satellite. The GEO Uplink System (GUS) clock has an independent free running clock. However, the GUS clock must track WNT (GPS time) to enable accurate ranging from the GEO satellite signal-in-space (SIS) so that a clock steering algorithm is necessary. The GUS clock steering algorithms reside in a WAAS Message Processor (WMP). WAAS Type 9 messages (GEO navigation messages) are inputs to the GUS WMP, provided by the WMS.

In accordance with the present invention, the GUST clock is steered to the GPS time epoch and WAAS Network Time (WNT). The GUST receiver clock error is the deviation of its 1 PPS (pulse per second) from the GPS epoch. The clock error is computed in a GUS processor by calculating the user position error by combining (in the least square sense, weighted with expected error statistics) multiple satellite data (pseudorange residuals called MOPS residuals) into a position error estimate with respect to surveyed GUS position. The clock error computed this way is relative to WAAS Network Time. The clock steering algorithm is initialized with the WAAS Type 9 message (GEO navigation message). With this arrangement, the GUST receiver clock is kept 1 PPS synchronized with the GPS time epoch. Since a 10 MHz frequency standard is the frequency reference for the receiver, its frequency output needs to be controlled so that the 1 PPS is adjusted. An inventive proportional, integral and differential (PID) controller synchronizes to the GPS time at GUST locations, as described in detail below.

The inventive clock steering mechanism also decouples the GUST clock from orbit errors and increases the observability of orbit errors in the orbit determination filter in the correction processor of the WMS. It also synchronizes GUST clocks at GUST locations to GPS time.

Referring again to FIG. 1, the reference stations 102 collect GPS and GEO measurements and send the collected information to the WAAS wide-area master stations (WMSs) 108. The WMSs 108 process the data to provide correctional and integrity information for each GEO and GPS satellite 104, 106. The correction information includes as separate components satellite ephemeris errors, clock bias and ionospheric estimation data. The corrections from the WMS 108 are sent to the GUS 110 for uplink to the GEO satellite 106.

The broadband SIS carriers include L1 and L5 signals for which code-carrier frequency coherence is maintained. The GEO 106 broadcasts the L1 signal at 1575.42 MHz and the L5 signal at 1176.45 MHz. In the L1 path, the GUST 110 receives integrity and correction data and WAAS specific messages from the WMS 108, adds forward error correction (FEC) encoding, and transmits the messages via a C-Band uplink to the GEO satellite 106 for broadcast to the WAAS user, e.g., aircraft 112. The GUST uplink signal uses the GPS standard positioning service waveform (C/A code, BPSK modulation); however, the data rate is higher (250 bits per second). The 250 bits of data are encoded with a one-half rate convolutional code, resulting in a 500-symbols-per-second transmission rate. Each symbol is modulated by the C/A code, a $1.023 \times 10^6$ chips/sec pseudo random sequence, to provide a spread spectrum signal. This signal is then binary phase-shift keying (BPSK) modulated by the GUS 110 onto an intermediate frequency (IF) carrier, upconverted to a C-Band frequency, and uplinked to the GEO 106.

In the conventional WAAS system, a GUS contains a clock steering algorithm that uses WAAS Type 9 messages (GEO navigation) from the WMS to align the GEO's epoch with the GPS epoch. The WAAS Type 9 message contains a term referred to as $a_{Gf0}$ or clock offset. This offset represents a correction, or time difference, between the GEO's epoch and WAAS Network Time (WNT). WNT is the internal time reference scale of WAAS and is required to track the GPS time scale, while at the same time providing users with the translation to Universal Time Coordinated (UTC). Since GPS master time is not directly obtainable, the WAAS architecture requires that WNT be computed at multiple WMSs using potentially differing sets of measurements from potentially differing sets of receivers and clocks (WAAS Reference Stations). WNT is required to agree with GPS time to within 50 nanoseconds. At the same time, the WNT to UTC offset must be provided to the user, with the offset being accurate to 20 nanoseconds. The conventional GUS calculates local clock adjustments. Based upon these clock adjustments, the frequency standard can be made to speed up, or slow the GUS clock. This will keep the total GEO clock offset within the range allowed by the WAAS Type 9 message so that users can make the proper clock corrections in their algorithms.

The inventive clock steering mechanism in the GUST 110 uses the above clock steering method during the initial 24 hours, for example, after it becomes primary. Once the GUST clock is synchronized with WNT, a second inventive method of clock steering uses a composite of the MOPS solution for the receiver clock error, the average of the $a_{Gf0}$, and the average of the MOPS solution as the input to a clock steering controller, as described more fully below.

Figure 2:
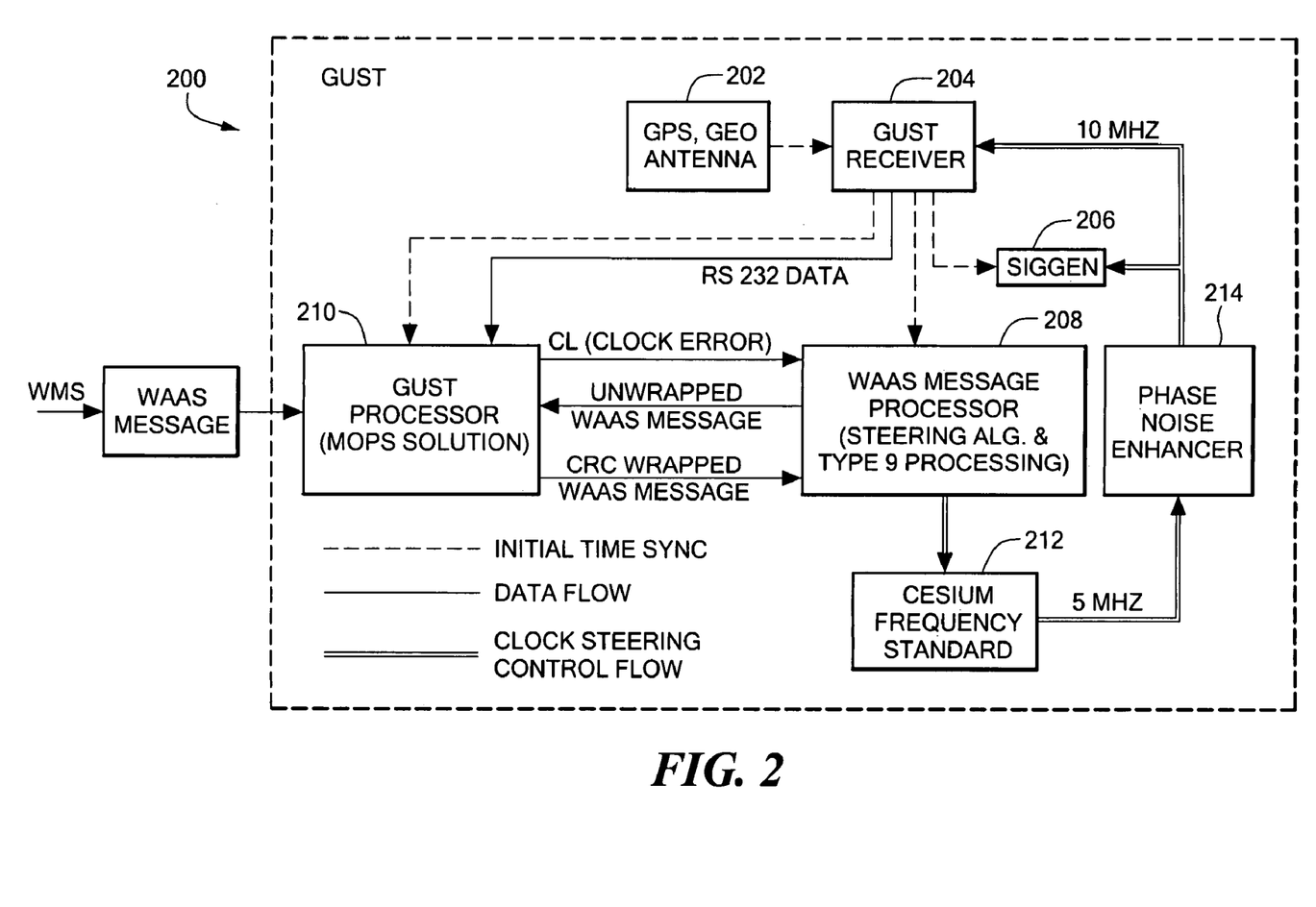
FIG. 2 is a GUST having clock steering in accordance with the present invention.

FIG. 2 shows an exemplary primary GUST system 200 having clock steering in accordance with the present invention. The GUST system 200 includes a Global Positioning System (GPS) and Geosynchronous Satellite antenna 202 coupled to a receiver 204. The receiver 204 provides initial time sync information to a signal generator 206, a WAAS message processor 208 and a GUST processor 210. The GUST receiver 204 also provides data to the GUST processor 210. The WAAS message processor (WMP) 208 provides inventive clock steering control information to the frequency standard system 212, which provides clock steering information to a phase noise enhancer 214, which passes on clock steering information to the receiver 204 and signal generator 206.

In addition, the GUST processor 210 passes on clock error information and sends wrapped WAAS messages to the WAAS message processor 208. The WAAS processor 208 sends unwrapped WAAS messages to the GUST processor 210. The WAAS message processor 208 unwraps the wrapped WAAS message to remove the CRC (Cyclic Redundancy Checking) data and send this unwrapped message (without CRC) to GUST processor 210.

The timing or code phase of the L1 and L5 signal-in-space (SIS) is set by the GUST receiver 204 and the signal generator 206. The GUST receiver 204 is issued based on the input reference frequency from the Cesium frequency standard 212. Without clock adjustment (steering), the Cesium frequency standard 212 output frequency changes over time. This results in the receiver 204 and the signal generator 206 deviating over time from the GPS epoch. Without correction, the deviation eventually becomes so large that the L1 and L5 code phase deviation exceeds the required limit.

By adjusting the Cesium frequency standard 212 with a frequency control command, the receiver 204 and the signal generator 206 can remain synchronized with the GPS epoch and WAAS Network Time (WNT).

For the primary GUST subsystem 200, the code phase deviation of the SIS is also affected by the uplink delay estimation error, and the deferential bias between the L1 and L5 signals that has not been compensated for by the control loop. A Type 9 Message Clock Offset aGf0 will be used in the initial clock steering to drive the initial code phase deviation to zero. Any code phase deviation due to the L1/L5 bias that occurs later will be corrected by using a long-term average of the aGf0 and used as input to the clock steering control laws.

For the backup GUST subsystem, the intent of the clock steering is to keep the receiver and signal generator synchronized with the WAAS Network Time (or GPS time). By achieving this synchronization, the clock error difference between primary and backup GUST is minimized.

Figure 3:
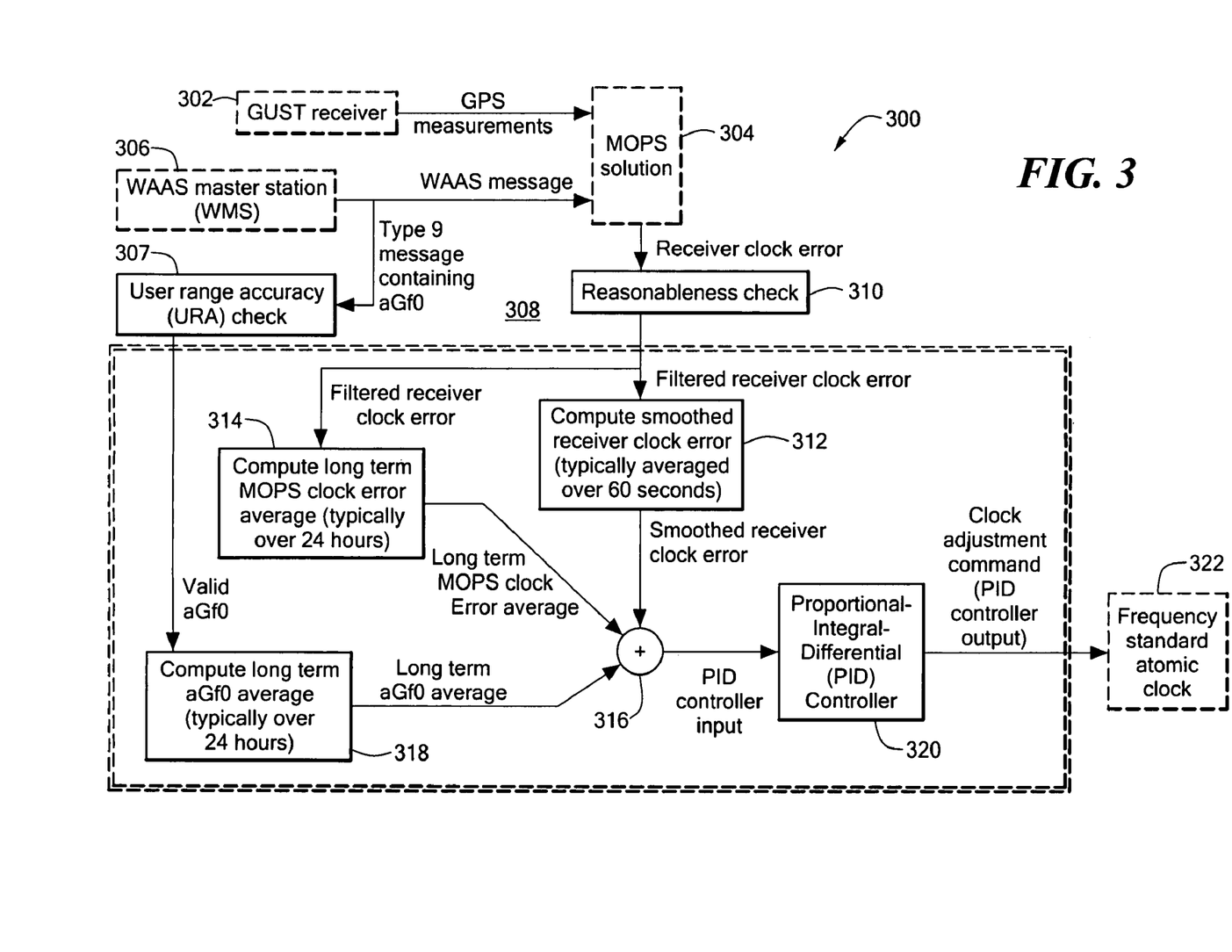
FIG. 3 is a schematic depiction of an exemplary clock steering mechanism in accordance with the present invention.

FIG. 3 shows a primary GEO uplink subsystem type-1 (GUST) 300 with clock steering in accordance with the present invention. A GUST receiver 302 sends GPS measurements to a GUST processor 304, which can be substantially similar to the GUST processor 110 of FIG. 1. A WAAS master station (WMS) 306 provides WAAS messages to the GUST processor 304 and a Type 9 message containing aGf0 information to a user rage accuracy (URA) check module 307. In an exemplary embodiment, the processing associated with blocks 307, 310, 312, 314, 316, 318, and 320 in can be performed in the WAAS message processor 208 of FIG. 2. The processing for block 304 can be performed in the GUST processor 210.

The GUST processor 304 sends receiver clock error information to a WAAS message processor 308 which performs a conventional reasonableness check 310 process. The reasonableness check process 310 outputs a filtered receiver clock error to smoothing module 312 and a long-term MOPS clock error module 314. The smoothing module 312 computes a smoothed receiver clock error, which can be averaged over sixty seconds, for example. The smoothing module provides a smoothed receiver cock error output to a summing module 316. More particularly, the smoothing module 312 takes the sum of the current receiver clock error and all the valid receiver clock errors that pass the reasonableness check (module 310) in the last X seconds. It then divides that sum by the total number of valid receiver clock error to obtain the smoothed receiver clock error. In one embodiment, X=59 seconds so that the average is computed over a 60-second period. In general, X should be no more than 3600 (1 hour).

The long term MOPS clock error module 314, which receives the filtered receiver clock error from the reasonableness check module 310, computes the long term MOPS clock error average, such as over a twenty-four hour period. The long term MOPS clock error average is provided to the summing module 316. First, the sum of all valid receiver clock errors that pass the reasonableness check (module 310) over the past Y hours is computed. The sum is then divided by the number of valid receiver clock errors to obtain the long term MOPS clock error average. The value for Y is typically 24 hours.

A long-term aGf0 module 318, which receives a valid aGf0 signal from the URA check module 307, computes a long term aGf0 average, such as over twenty four hours. The aGf0 module 318 provides a long-term aGf0 signal to the summing module 316. First, the sum of all valid aGf0 messages that pass the User Range Accuracy (URA) check (module 307) over the past Z hours is computed. The sum is then divided by the number of valid aGf0's to obtain the long term aGf0 average. The value for Z is typically 24 hours.

The summing module 316 provides an input to a proportional-integral-differential (PID) controller 320, which is described more fully below. The PID controller 320 then provides clock adjustment command information to the frequency standard atomic clock 322.

Clock steering in the Primary GUST is now described in further detail. Determination of receiver clock error is based on the user position solution algorithm described in the WAAS MOPS. Components of the MOPS weighted least squares solution are the observation matrix (G), the measurement weighting matrix (W) and the MOPS residual column vector ($\Delta\rho$). The weighted gain matrix (K) is calculated using G and W as set forth in Equation (1) below:

$$K=(G^TWG)^{-1}G^TW \quad \text{Eq. 1}$$

The column vector then for the user position error and the clock bias solution is described in Equations (2a, 2b, 2c) below:

$$\Delta X=K\Delta\rho \quad \text{Eq. 2a}$$

$$\Delta X=(G^TWG)^{-1}G^TW\Delta\rho \quad \text{Eq. 2b}$$

where:

$$\Delta X = \begin{bmatrix} \Delta X(N) \\ \Delta X(E) \\ \Delta X(U) \\ C_b \end{bmatrix} \quad \text{Eq. 2c}$$

and $\Delta X(U)$ is the Up error, $\Delta X(E)$ is the East error, $\Delta X(N)$ is the North error and $C_b$ is the clock bias or receiver clock error as a resultant of the MOPS weighted least squares solution.

The observation matrix (G), n×4, is computed in Up-East-North (UEN) reference using the line of sight (LOS) azimuth ($Az_i$) and LOS elevation ($El_i$) from the GUST omni antenna to the space vehicle (SV). The value n is the number of satellites in view. The formula for calculating the observation matrix is set forth in Equation (3):

$$G = \begin{bmatrix} \cos(El_1)\cos(Az_1) & \cos(El_1)\sin(Az_1) & \sin(El_1) & 1 \\ \cos(El_2)\cos(Az_2) & \cos(El_2)\sin(Az_2) & \sin(El_2) & 1 \\ \vdots & \vdots & \vdots & \vdots \\ \cos(El_n)\cos(Az_n) & \cos(El_n)\sin(Az_n) & \sin(El_n) & 1 \end{bmatrix} \quad \text{Eq. 3}$$

The n×n weighting matrix (W) is a function of the total variance ($\sigma_i^2$) of the individual satellites in view. The inverse of the weighting matrix is show below in Equation (4):

$$W^{-1} = \begin{bmatrix} \sigma_1^2 & 0 & 0 & \vdots & 0 \\ 0 & \sigma_2^2 & 0 & \vdots & 0 \\ 0 & 0 & \sigma_3^2 & \vdots & 0 \\ \vdots & \vdots & \vdots & \ddots & \vdots \\ 0 & 0 & 0 & 0 & \sigma_n^2 \end{bmatrix} \quad \text{Eq. 4}$$

Equation (5) to calculate the total variance ($\sigma_i^2$) is:

$$\sigma_i^2 = \left(\frac{UDRE_i}{3.29}\right)^2 + \left(\frac{F_{pp_i}^2 \times \sigma_{UIVE_i}^2}{3.29^2}\right) + \frac{\sigma_{tropo,i}^2}{\sin^2(El_i)} \quad \text{Eq. 5}$$

The algorithms for calculating user differential range error (UDREi), user ionospheric vertical error variance $\sigma_{UIVE_i}^2$, LOS obliquity factor ($F_{pp_i}$), and the standard deviation of uncertainty for the vertical troposphere delay model ($\sigma_{tropo,i}$) are found in the WAAS MOPS and well known to one of ordinary skill in the art.

The MOPS residuals ($\Delta\rho$), as described below in Equation (6) are the difference between the smoothed MOPS measured pseudorange ($PR_{M,i}$) and the expected pseudorange ($PR_{corr,i}$):

$$\Delta\rho=PR_{M,i}-PR_{corr,i} \quad \text{Eq. 6}$$

The MOPS measured pseudorange ($PR_{M,i}$) in earth centered earth fixed (ECEF) reference is corrected for earth rotation, for WAAS clock corrections, for ionospheric effects and for tropospheric effects. Equation (7) to calculate $PR_{M,i}$ is:

$$PR_{M,i}=PR_{L,i}+\Delta PR_{CC,i}+\Delta PR_{FC,i}+\Delta PR_{ER,i}-\Delta PR_{T,i}-\Delta PR_{I,i}-\Delta PR_{mp} \quad \text{Eq. 7}$$

The algorithms to calculate smoothed L1 pseudorange ($PR_{L,i}$), pseudorange clock correction ($\Delta PR_{CC,i}$), pseudorange fast correction ($\Delta PR_{FC,i}$), pseudorange earth rotation correction ($\Delta PR_{ER,i}$), pseudorange troposphere correction ($\Delta PR_{T,i}$) and pseudorange ionosphere correction ($\Delta PR_{I,i}$) are found in the WAAS MOPS. The computation of pseudorange multipath correction ($\Delta PR_{mp}$) is well known to one of ordinary skill in the art.

Expected pseudorange ($PR_{corr,i}$), ECEF, at the time of GPS transmission is computed from broadcast ephemeris corrected for fast and long term corrections. The calculation is defined in Equation (8) below:

$$PR_{corr,i} = \sqrt{(X_{corr,i}-X_{GUS})^2+(Y_{corr,i}-Y_{GUS})^2+(Z_{corr,i}-Z_{GUS})^2} \qquad \text{Eq. 8}$$

The algorithm to calculate SV position corrections ($X_{corr,i}$, $Y_{corr,i}$, $Z_{corr,i}$) is found in the WAAS MOPS. The fixed position parameters of the GUST ($X_{GUST}$, $Y_{GUST}$, $Z_{GUST}$) are site specific.

Conventional dual frequency carrier leveling techniques can be used to reduce the multipath noise. Carrier cycle slip monitors are provided to protect the carrier level algorithms.

The measurement multipath noise is then estimated as a function of continuous carrier leveling time using a deterministic algorithm that is based on the maximum initial multipath for the GUST receiver correlator spacings and the time since the last cycle slip.

Each of the GUST receivers generates pseudorange and carrier phase measurements for those satellites in view. If the satellite's pseudorange signals are reflected and delayed (relative to the direct signal) in arriving at the GUST receiver, then the measurement data may be in error for those satellites. The amount of the error is dependent on the delay time and the receiver correlator type. The system corrects for multipath errors utilizing the pseudorange and the carrier phase measurement (which is not subject to significant multipath errors) received.

For both the primary and backup GUST clock steering algorithm, in an exemplary embodiment, the control law is implemented using a PID (proportional plus integral plus differential) controller and it has the following formulation. The PID controller in s domain is formulated as follows in Equation (9).

$$u(s)=k^*e(s)+(k/T_I)^*(1/s)\ e(s)+k^*T_D^*e(s)^*s \qquad \text{Eq. 9}$$

where k is the proportional gain, $T_I$ is the integral time, $T_D$ is the differential time, e(s) is the input to the controller, and u(s) is the output of the controller. When the above equation is transformed into discrete time domain, Equation (10) below results:

$$u(n)=u(n-1)+(k+kT/T_I+kT_D/T)e(n)-(k+2^*kT_D/T)e(n-1)+kT_D/Te(n-2) \qquad \text{Eq. 10}$$

where T is the sampling time.

Let $k\_alpha=(k+kT/T_I+kT_D/T)$, $k\_beta=-(k+2^*kT_D/T)$, and $k\_gamma=kT_D/T$ and let x(t) be the clock error. Since the control system compensates for the frequency drift, the input x(t) has to be negated so that x(t) equals to –e(t) and equation (11) below is obtained.

$$u(n)=-k\_alpha^*x(n)+k\_beta^*x(n-1)+k\_gamma^*x(n-2)) \qquad \text{Eq. 11}$$

The output of the control law is the frequency adjustment command that will be sent to the frequency standard 322 to adjust the atomic clock frequency. The adjusted atomic clock frequency will keep the receiver 302 and the signal generator 206 (FIG. 2) synchronizing with the GPS epoch and WAAS Network Time. Thus, closed loop control of the frequency standard 322 is established.

Twenty-four hours, for example, after the GUST becomes Primary, the input to the PID controller is the combination of different errors as follows in Equation (12):

$$\begin{aligned}\text{PID input} = {}& \text{smoothed receiver clock error}- \\ & \text{long term MOPS clock error average}+ \\ & \text{long term Type 9 aGf0 average}\end{aligned} \qquad \text{Eq. 12}$$

The PID input described in Equation (12) is the counterpart of x(n) in Equation (11). The PID inputs in Equation (12) that are computed in the previous time stamps n-1 and n-2 are the counterparts of x(n-1) and x(n-2) in Equation (11) respectively.

As described above, smoothed receiver clock error 312 is the average of the filtered receiver clock error over a short period of time that is typically no more than 1 hour, and it is calculated continuously. Long term MOPS clock error 314 is the average of the filtered receiver clock error over a long period of time that is typically twenty-four hours, and it is calculated typically once every twenty-four hours. Long term Type 9 aGf0 average 318 is the average of the Type 9 message clock offset aGf0 over a period of time that is typically twenty-four hours, and it is calculated typically once every twenty-four hours.

For the backup GUST subsystem, only the smoothed receiver clock error described above is used as the input to the PID controller.

While illustrative clock steering is shown and described in conjunction with a WAAS system, it is understood that the techniques may be implemented in a variety of systems requiring clock adjustments. The exemplary embodiments shown and described herein show exemplary partitions between hardware and software. It will be readily apparent to one of ordinary skill in the art that functionality described herein can be performed in a variety of hardware and software implementation to meet the needs of a particular application. It is further understood that the term circuitry as used herein includes hardwired circuitry, digital circuitry, analog circuitry, programmable circuitry, and so forth. The programmable circuitry may operate on computer programs.

What is claimed is:

1. A method, comprising:
   for a wide area augmentation system (WAAS) having a GEO uplink subsystem Type 1 (GUST), computing a smoothed receiver clock error signal to input to a summing module;
   computing a long term clock error average signal to input to the summing module;
   computing a long term clock offset average signal to input to the summing module; and
   providing an output from the summing module as an input signal to a proportional-integral-differential (PID) module to generate a clock steering signal.

2. The method according to claim 1, wherein the $$\begin{aligned}\text{PID input} = {}& \text{smoothed receiver clock error signal}- \\ & \text{long term MOPS clock error average signal}+\end{aligned}$$

-continued long term Type 9 $aGf0$ average signal.

3. The method according to claim 1, wherein the long term offset average signal includes a aGf0 signal.

4. The method according to claim 1, further including providing the clock steering signal to a frequency standard atomic clock.

5. The method according to claim 1, further including receiving a receiver clock error signal from a GUST processor as an input for computing the smoothed receiver clock error input.

6. The method according to claim 5, further including a GUST receiver providing GPS measurements to the GUST processor for generating the receiver clock error signal.

7. The method according to claim 5, further including receiving by the GUST processor WAAS messages from a WAAS master station.

8. The method according to claim 1, further including performing a reasonableness check on the receiver clock error.

9. A system comprising:
an antenna;
a receiver coupled to the antenna;
a first processor coupled to the receiver to generate a MOPS solution;
a signal generator coupled to the receiver;
a phase noise enhancer coupled to the signal generator and the receiver;
a frequency standard coupled to the phase noise enhancer; and
a second processor coupled to the receiver, the first processor, and the frequency standard to process clock steering including implementing a proportional-integral-differential (PID) controller having as inputs a smoothed receiver clock error signal, a long term MOPS clock error average signal, and a long term clock offset average signal.

10. The system according to claim 9, wherein the antenna receives signals radiated by a GEO satellite.

11. The system according to claim 9, further including a wide-area master station coupled to geographically distributed reference stations.

12. The system according to claim 11, wherein the references stations provide information to the wide-area master stations for received GPS signals.

13. A receiving device, comprising:
a processor to compute position information from signal-in-space (SIS) from a GEO satellite having signals generated from a GUST with clock steering that included:
computing a smoothed receiver clock error signal to input to a summing module;
computing a long term clock error average signal to input to the summing module;
computing a long term clock offset average signal to input to the summing module;
providing an output from the summing module as an input signal to a proportional-integral-differential (PID) module to generate a clock steering signal.

14. The device according to claim 13, wherein the $$PID\ input = \text{smoothed receiver clock error signal} -$$
$$\text{long term } MOPS \text{ clock error average signal} +$$
$$\text{long term Type 9 } aGf0 \text{ average signal.}$$

15. The device according to claim 13, wherein the clock steering further included providing clock steering information to a frequency standard atomic clock.

16. The device according to claim 13, wherein the device is adapted to receive GPS signals.

* * * * *

UNITED STATES PATENT AND TRADEMARK OFFICE
CERTIFICATE OF CORRECTION

PATENT NO. : 7,286,082 B2
APPLICATION NO. : 11/063782
DATED : October 23, 2007
INVENTOR(S) : Hsu et al.

It is certified that error appears in the above-identified patent and that said Letters Patent is hereby corrected as shown below:

Col. 1, line 36, delete "improve" and replace with -- improves --.

Col. 3, line 66, delete "slow the" and replace with -- slow down the --.

Col. 5, line 3, delete "rage" and replace with -- range --.

Col. 5, line 5, delete "in can be" and replace with -- can be --.

Col. 5, line 16-17, delete "The smoothing module provides" and replace with -- The smoothing module 316 provides --.

Col. 5, line 17, delete "cock" and replace with -- clock --.

Col. 5, line 22, delete "error" and replace with -- errors --.

Col. 6, line 31, delete "show" and replace with -- shown --.

Col. 6, line 38, delete

"$$W^{-1} = \begin{bmatrix} \sigma_1^2 & 0 & 0 & \vdots & 0 \\ 0 & \sigma_2^2 & 0 & \vdots & 0 \\ 0 & 0 & \sigma_3^2 & \vdots & 0 \\ \vdots & \vdots & \vdots & \ddots & \vdots \\ 0 & 0 & 0 & 0 & \sigma_n^2 \end{bmatrix} \quad \text{Eq. 4}"$$

and replace with $$-- W^{-1} = \begin{bmatrix} \sigma_1^2 & 0 & 0 & \vdots & 0 \\ 0 & \sigma_2^2 & 0 & \vdots & 0 \\ 0 & 0 & \sigma_3^2 & \vdots & 0 \\ \vdots & \vdots & \vdots & \ddots & \vdots \\ 0 & 0 & 0 & 0 & \sigma_n^2 \end{bmatrix} \quad \text{Eq. 4} --$$

UNITED STATES PATENT AND TRADEMARK OFFICE
CERTIFICATE OF CORRECTION

PATENT NO. : 7,286,082 B2
APPLICATION NO. : 11/063782
DATED : October 23, 2007
INVENTOR(S) : Hsu et al.

It is certified that error appears in the above-identified patent and that said Letters Patent is hereby corrected as shown below:

Col. 6, line 50, delete " $\sigma_{UIVE_i}^2$ " and replace with -- $\sigma_{UIVE_i}^2$ --.

Col. 6, line 67, delete

"$PR_{M,i} = PR_{L,i} + \Delta PR_{CC,i} + \Delta PR_{FC,i} + PR_{ER,i} - \Delta PR_{T,i} - \Delta PR_{I,I} - - \Delta PR_{mp}$     Eq. 7" and replace with

-- $PR_{M,i} = PR_{L,i} + \Delta PR_{CC,i} + \Delta PR_{FC,i} + \Delta PR_{ER,i} - \Delta PR_{T,i} - \Delta PR_{I,i} - - \Delta PR_{mp}$     Eq. 7 --.

Col. 7, line 14, delete "Eq.8)" and replace with -- Eq.8 --.

Signed and Sealed this

Nineteenth Day of August, 2008

JON W. DUDAS
*Director of the United States Patent and Trademark Office*